United States Patent [19]

Meisner et al.

[11] Patent Number: 5,675,426
[45] Date of Patent: Oct. 7, 1997

[54] TELEVISION RECEIVER WITH DOORS FOR ITS DISPLAY SCREEN WHICH DOORS CONTAIN LOUDSPEAKERS

[75] Inventors: Edward Herman Meisner, Short Hills; Michael Patrick Ballone, New Providence, both of N.J.; Keith Kristiansen, Stratford, Conn.; John Flick Garrison, Allendale, N.J.; Allen LeRoy Limberg, Vienna, Va.

[73] Assignee: Samsung Electronics Co., Ltd., Kyungki-do, Rep. of Korea

[21] Appl. No.: 688,142

[22] Filed: Jul. 29, 1996

Related U.S. Application Data

[63] Continuation of Ser. No. 388,064, Feb. 10, 1995, abandoned.

[51] Int. Cl.[6] .............................. H04N 5/64; H04R 25/00
[52] U.S. Cl. .................. 358/838; 358/827; 381/24; 381/205
[58] Field of Search ........................ 348/826–828, 348/836, 838, 726–729, 787–789, 791, 794; 345/156; 381/24, 87, 88, 90, 188, 205; H04N 5/64; H04R 25/00

[56] References Cited

U.S. PATENT DOCUMENTS

| | | | |
|---|---|---|---|
| 2,547,447 | 9/1951 | De Boer | 181/31 |
| 3,627,392 | 12/1971 | Ruppersburg | 312/8 |
| 3,680,936 | 8/1972 | Backhaus | 312/7 |
| 3,926,487 | 12/1975 | Reyes | 312/223 |
| 4,070,546 | 1/1978 | Hirota | 179/1 GA |
| 4,303,807 | 12/1981 | Sato | 179/146 E |
| 4,525,746 | 6/1985 | Mangold | 358/254 |
| 4,528,597 | 7/1985 | Klein | 358/254 |
| 4,630,821 | 12/1986 | Greenwald | 348/788 |
| 4,696,037 | 9/1987 | Fierens | 381/24 |
| 4,769,634 | 9/1988 | Killian, Jr. et al. | 348/827 |
| 5,119,421 | 6/1992 | Reime | 381/24 |
| 5,138,462 | 8/1992 | Skovgaard | 358/254 |
| 5,164,830 | 11/1992 | Kim | 348/729 |
| 5,214,514 | 5/1993 | Haberkern | 348/838 |
| 5,243,434 | 9/1993 | Nodama | 348/827 |
| 5,315,663 | 5/1994 | Karl-Heinz Thiele | 371/188 |
| 5,343,257 | 8/1994 | Kohno | 348/842 |
| 5,361,406 | 11/1994 | Wignot et al. | 348/729 |
| 5,440,645 | 8/1995 | Freadman | 381/205 |
| 5,448,647 | 9/1995 | Koizumi | 381/188 |
| 5,452,025 | 9/1995 | Koizumi | 381/88 |
| 5,548,657 | 8/1996 | Fincham | 381/205 |
| 5,590,771 | 1/1997 | Cota | 381/24 |

FOREIGN PATENT DOCUMENTS

| | | |
|---|---|---|
| 304629 | 3/1989 | European Pat. Off. . |
| 6-70269 | 3/1994 | Japan . |
| 2252003 | 7/1992 | United Kingdom . |
| 2269516 | 2/1994 | United Kingdom ............ H04N 5/64 |

*Primary Examiner*—Kim Vu
*Attorney, Agent, or Firm*—Sughrue, Mion, Zinn, Macpeak & Seas, PLLC

[57] ABSTRACT

A light-in-weight portable television receiver or computer monitor has doors that close over its display screen, to facilitate it being transported by a child of nine or ten years age. The display screen is sustantially vertical during normal viewing. These doors have loudspeakers on their interior surfaces, which doors open out from the sides of the cabinet to space the loudspeakers further apart for better stereophonic sound reproduction.

37 Claims, 5 Drawing Sheets

TELEVISION RECEIVER WITH DOORS FOR ITS DISPLAY SCREEN WHICH DOORS CONTAIN LOUDSPEAKERS

This is a continuation of application Ser. No. 08/388,064 filed Feb. 10, 1995, now abandoned.

The invention relates to television receivers having display screens with doors and, more particularly, to such television receivers having loudspeakers in their doors.

BACKGROUND OF THE INVENTION

A portable television receiver particularly suited for the youth market is the concept of the inventors, which television receiver is small enough and light enough to be easily transported by a child of nine or ten years age and is suited for the playing of video games. In the interest of eliminating battery weight such television receiver, though portable, is normally powered by connection to electric power mains. A portable computer monitor particularly suited for the youth market, which computer monitor is small enough and light enough to be easily transported by a child of nine or ten years age and is suited for the playing of video games, is a related concept of the inventors. Such a television set or computer monitor is termed "child-transportable" in this specification and the claims following this specification. Such a "child-transportable" television set or computer monitor is likely to be frequently moved by children apt to be careless when their thoughts are distracted by the prospect of playing video games. Protective covering of the display screen to reduce the likelihood of damage to the kinescope or liquid crystal display device during such moving (and of possible consequent injury to a child) is accordingly contemplated.

Large console and hutch television receivers of the past have employed doors to hide their display screens when the receivers are shut off; the doors were used primarily for cosmetic reasons, so as not to have to see the dead eye of a rasterless kinescope. At one time roll-front cabinets were common for European television receivers, the roll-front doors taking up less room when opened. Doors have also been used for cosmetic reasons in stereophonic audio systems. In U.S. Pat. No. 5,119,421 issued 2 Jun., 1992 and entitled STEREO SYSTEM CABINET WITH LOUD-SPEAKER DOOR ASSEMBLY Reime describes a stereo system cabinet with front-opening loudspeaker panels that pivot around vertical axes, which close as doors when the stereo system cabinet is not in use. The use of doors in such large television and audio equipment is somewhat cumbersome. So, in most homes the doors tend to be left open unless the preacher or some other important guest comes to call. The tendency to close the doors but seldom and the cost of the doors, particularly when finished in fine wood veneers, has reduced the market for television receivers with doors for hiding their display screens.

Doors are not used primarily for cosmetic purposes in portable television receivers or computer monitors embodying the invention, but rather are used primarily for protecting the display screens during transport, in order to reduce the likelihood of damage to the kinescopes or liquid crystal display devices. The smaller size of these doors avoids their being cumbersome, even though they are front-opening hinged doors, rather than roll-front doors.

Stereophonic sound is provided for some television broadcasts and for some video games, and there is a problem with separating the loudspeakers of a portable television receiver sufficiently to achieve directional sound reproduction. Satellite loudspeakers connected by cabling to the portable television receiver can be used to overcome this problem. However, the satellite loudspeakers interfere with ready portability, are likely to be lost by a child during transport, and contribute to the cluttering up of the household by child's play. The mounting of the stereophonic loudspeakers in doors opening to the left and to the right of the display screen provides separation sufficient to achieve directional sound reproduction for a child seated close to the portable television receiver, close seating being normal with the small screen sizes associated with a receiver small enough to be transported by a child. Hinged doors, including a left door hinged from the cabinet for covering the left-hand side of the display screen when closed and for extending from the left-hand side of the cabinet when opened, and including a right door hinged from the cabinet for covering the right-hand side of the display screen when closed and for extending from the right-hand side of the cabinet when opened, not only protect the kinescope or liquid crystal display device during transport. During transport such doors also protect the loudspeakers mounted on the insides of those doors as closed over the display screen.

In U.S. Pat. No. 2,547,447 issued 3 Apr., 1951 and entitled APPARATUS FOR STEREOPHONIC SOUND REPRODUCTION de Boer describes the mounting of stereophonic loudspeakers on right and left sliding doors of a stereophonic radio receiver. In de Boer's apparatus the loudspeakers are mounted to have their openings on the outsides of the right and left sliding doors as closed over the radio receiver, which tends to leave the loudspeakers inadequately protected during transport. For example, when transport is from one building to another during a rainstorm, water is likely to enter the speaker opening. Mounting the loudspeakers on the insides of hinged doors that close over the display screen can provide protection from such event, the cabinet and doors of a child-transportable television receiver or computer monitor generally being made of an engineering plastic material impervious to water.

The mounting of loudspeakers in doors covering the display screen of a television receiver during transport involves considerations not encountered by de Boer or Reime, concerning the interaction of magnetic fields emanating from the loudspeakers magnetizing metal components near the display screen when the doors are closed over the display screen, it is here pointed out. Permanent magnets in the drive motors of the loudspeakers distort the magnetic conditions near the faceplate of a color kinescope, for example. Magnetization of metal components near the display screen creates local magnetic fields that affect the landing of the electronic beams on a pattern of display-screen phosphors creating color purity problems.

Nowadays, portable television receivers using color kinescopes are customarily equipped with a set of automatic de-gaussing coils initialized during powering up of the receiver after the receiver has been off a few minutes. Powering up of the receiver before the doors over the display screen are opened up and locked or left in open position interferes with the automatic de-gaussing coil removing magnetic field anomalies near the display screen induced by magnetic fields emanating from the loudspeakers, however, it is here pointed out. Accordingly, if an aperture grill color kinescope, shadow mask color kinescope, or related type of color kinescope is used as the display device in a child-transportable television receiver or computer monitor, equipped with loudspeakers in doors hinged to close over the display screen, the automatic de-gaussing should be deferred until after the doors are opened up and locked or left in open position, it is here pointed out. This can be done, also deferring the application of power to the television receiver or computer monitor until the doors are opened up and locked or left in open position, it is here pointed out.

The color purity problems posed by including loudspeakers in doors hinged to close over the display screen can be mitigated or avoided in other ways, it is here pointed out. The use of non-magnetic materials in the aperture grill or shadow mask, the chassis and the kinescope mounts reduces color purity problems supposing an aperture grill color kinescope, shadow mask color kinescope, or related type of color kinescope is used as the display device. The use of engineering plastics in a child-transportable television receiver or computer monitor is attractive anyway for reducing weight and for providing resistance to damage resulting from accidental dropping or banging against other objects. The loudspeaker motors can be constructed to avoid the use of permanently magnetized structures, being constructed entirely using electromagnetic structures. Indeed, the motors of the loudspeakers in the doors can be of an electrostatic type rather than an electromagnetic type, better to avoid magnetic structures. Since small electrostatic loudspeakers with good lower frequency response are a problem, the loudspeakers in the doors can be aided by a lower-frequency-response loudspeaker of electromagnetic type located in the main body of the cabinet or in a base therefor. The color purity problems can be avoided by replacing the standard color kinescope with another color display device, such as a liquid crystal color display device, or such as a single-gun kinescope using controlled-penetration phosphors, which can be of "onion-skin" type by way of example. A more conventional color kinescope is favored, however, because of its lower cost.

Other factors are considered in the design of a child-transportable television receiver or computer monitor. To keep the cabinet weight down to facilitate transportation by a child, a design without 50/60 Hz power transformer is used. The cabinet exclusive of its hinged doors over the display screen completely surrounds that portion of the apparatus used for generating the images on the display screen, and is free from voids that would allow the insertion of objects into the chassis that would pose an electric shock hazard. The cabinet is preferably designed to encourage two-handed carrying by the child, with the display screen doors against the stomach of the child. This lessens the chance of injury during lifting and reduces the likelihood of dropping the apparatus or of banging its cabinet into other persons or objects. Carrying handles, if they are provided, are preferably on the sides of the cabinet or underneath the cabinet to discourage one-handed carrying by the child. The cabinet when closed for carrying by a child is designed with large-radius rounded corners to reduce the likelihood of the child injuring himself, another child, doorways or walls of a house, furniture in a house, or a vehicle. Yielding or cushioned surfaces on the cabinet are preferable, if cost considerations can be met. The hinges on the cabinet doors and any locking mechanisms on the doors are designed to avoid the possibility of pinching fingers or other body parts. The hinges on the cabinet doors are of such sturdy construction that the cabinet doors cannot be torn off the cabinet. If the hinges use hingepins (being of piano type, for example, the ends of each hinge is provided with guards to forestall its hingepin being extracted by a child. The conduction of electric driving signals to the loudspeakers in the doors should be done such that the conductors are not easily susceptible to a child's tampering. The power cord is preferably retractable into the cabinet during transportation of the child-transportable television receiver or computer monitor. Apparatus to play a prerecorded "pull the plug" reminder message can be included in the child-transportable television receiver or computer monitor and actuated by the child lifting the receiver or monitor from a position of rest. The apparatus to play the reminder message can be similar to that used in some toys (such as talking dolls, for example).

SUMMARY OF THE INVENTION

The invention in one of its aspects is embodied in a child-transportable television receiver or computer monitor having doors that cover its display screen during transport. Stereophonic loudspeakers mounted in doors opening to the left and to the right of the display screen provide separation sufficient to achieve directional sound reproduction for a child seated close to the portable television receiver. If the display is provided by a kinescope, it is a low-emission type that is safe for such close seating.

In a portable television receiver or computer monitor using a color kinescope, having doors that cover its display screen during transport, and having stereophonic loudspeakers mounted in doors opening to the left and to the right of the display screen, in a further aspect of the invention automatic de-gaussing is deferred until after the doors over the display screen are opened up and locked or left in open position. This facilitates correction of remnant magnetic field anomalies near the display screen previously induced by magnetic fields emanating from the loudspeakers.

A portable television receiver or computer monitor constructed in accordance with another aspect of the invention uses a liquid crystal color display device rather than a color kinescope, has doors that cover its display screen during transport, and has stereophonic loudspeakers mounted in doors opening to the left and to the right of the display screen. The liquid crystal color display device is unaffected by any magnetic fields emanating from the loudspeakers when the doors are closed over the display screen.

A portable television receiver or computer monitor constructed in accordance with another aspect of the invention has doors that cover its display screen during transport and has stereophonic loudspeakers mounted in doors opening to the left and to the right of the display screen, which stereophonic loudspeakers constructed so as not to have permanently magnetized elements therewithin.

DETAILED DESCRIPTION

Figure 1:
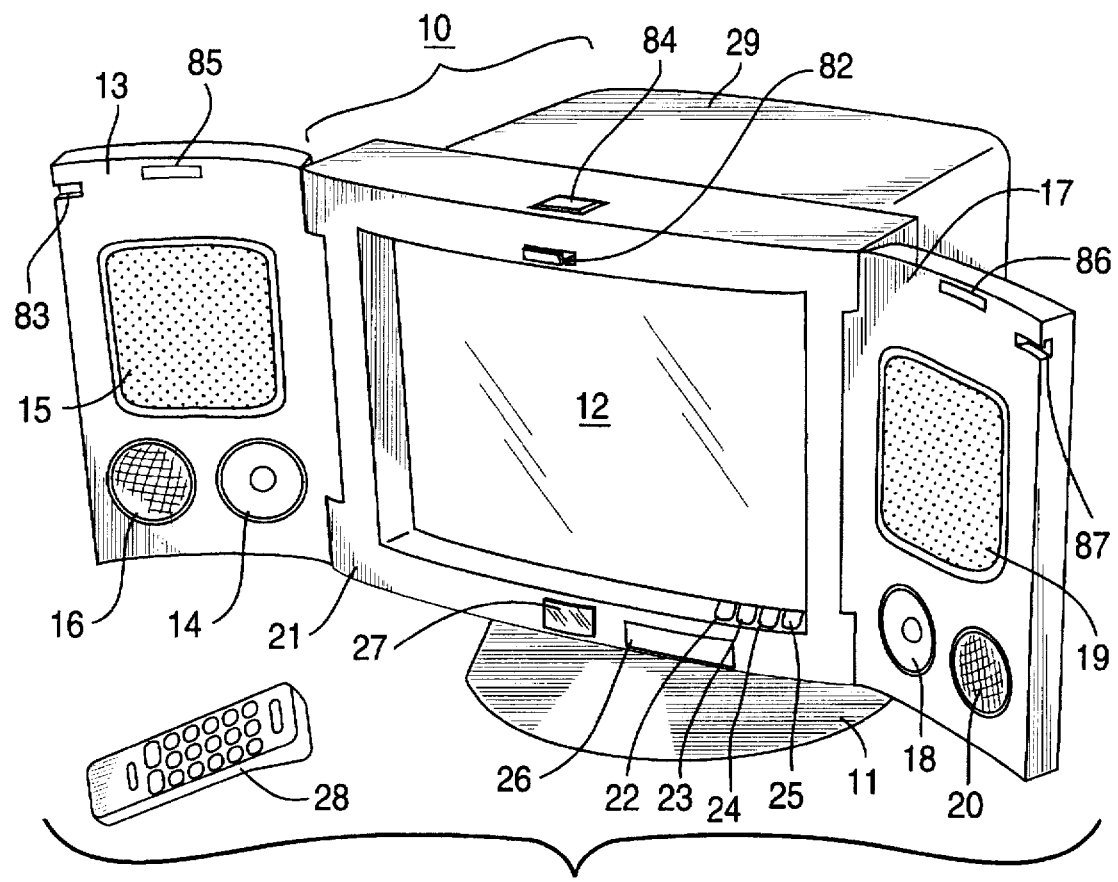
FIG. 1 is a front perspective view of a child-transportable television receiver embodying the invention, having doors that cover the display screen of its color kinescope during transport, and having stereophonic loudspeakers mounted in the doors, which open to the left and to the right of the display screen.

The child-transportable television receiver of FIG. 1 has a cabinet 10, which because of the likelihood of rugged handling and of the desire for light weight is preferably made of an engineering plastic material. The engineering plastic material should be impervious to water. The cabinet 10 is shown as being on a swivel-and-tilt stand 11. A front side of the cabinet 10 has a display screen 12 of a display device such as a low-emission, 33-centimeter-diagonal kinescope disposed therewithin. A left door 13 shown in its fully open position has tweeter, woofer and mid-range loudspeakers 14, 15 and 16 mounted therewithin so they radiate sound from the exposed inner surface of the door. A right door 17 shown in its fully open position has tweeter, woofer and mid-range loudspeakers 18, 19 and 20 mounted therewithin so they radiate sound from the exposed inner surface of the door.

FIG. 1 is drawn presuming the left door 13 to be hinged to the cabinet 10 by lugs extending into holes within the cabinet 10 and presuming the right door 17 to be similarly hinged to the cabinet 10, a hinging arrangement called "opposed pin and eye". Other hinging arrangements are possible, however, such as a strong piano hinge. If a flexible engineering plastic material with sufficient strength after repeated flexing can be found, the hinge may be formed by folding the plastic itself.

The ends of the lugs in the doors 13 and 17 which serve as hingepins in the opposed pin and eye hinging arrangement have holes therein, not visible in FIG. 1. The electrical wires for conducting sound-descriptive signals from the left audio amplifier(s) in the television receiver to the loudspeakers 14, 15 and 16 in the left door 13 are threaded through one or more such holes in the ends of the lugs in the left door 13; and the electrical wires for conducting sound-descriptive signals from the right audio amplifier(s) in the television receiver to the loudspeakers 18, 19 and 20 in the right door 17 are threaded through one or more such holes in the ends of the lugs in the right door 17. Alternatively, the electrical wiring could pass through armored cables connecting between the cabinet 10 and respective ones of the doors 13 and 17, with voids being formed in the doors 13 and 17 to admit the armored cables when those doors are closed over the display screen 12.

The display screen 12 is surrounded by a bezel frame 21 of substantial depth for receiving the domes of the woofer speakers 15 and 19. The bezel frame 21 forms the front portion of the cabinet 10, and the doors 13 and 17 are hinged thereto. The bezel frame 21 and the doors 13 and 17 are provided with rounded corners to reduce the change of injury to a child carrying the set or falling against the set. The substantial depth of the bezel frame 21 affords somewhat better protection of the display screen 12 from being accidentally banged into and strengthens the bezel frame 21 as a structural member. FIG. 1 shows recessed rocker keys for the principal television set controls being located within the opening of the bezel frame 21, including a rocker key 22 for turning power on and off to the television receiver, a rocker key 23 for controlling audio volume up and down, a rocker key 24 for controlling channel selection up and down, and a rocker key 25 for selecting the source of radio-frequency signal supplied to the television receiver (and in some designs controlling the supply of power to television games used with the television receiver). Alternatively, these rocker key controls 22, 23, 24 and 25 can be located within an inset on the front of the bezel frame 21. A snap-open panel 26 on the front of the bezel frame 21 hides additional, seldom-used controls such as treble and bass controls for audio. The infrared sensor 27 for receiving remote control signals from an infrared remote control 28 is also located on the front of the bezel frame 21. The infrared remote control 28 has keys for controlling all television functions.

As shown in FIG. 1, a spring catch 82 can be installed in the top center front of the bezel frame 21, for engaging the top edges of slots 83 and 87 at the tops of the interior surfaces of the closed doors 13 and 17, to positively hold the doors 13 and 17 closed for transport. A push button 84 in the center top surface of the bezel frame 21 is depressed to release the doors 13 and 17. The tops of the interior surfaces of the closed doors 13 and 17 are provided with compression springs 85 and 86 to spring the doors 13 and 17 open when the push button 84 is depressed to release the spring catch 82. These compression springs 85 and 86 can be leaves of a springing plastic material and it is possible to form them in the interior plastic panels of doors 13 and 17 themselves. Alternatively, the compression springs 85 and 86 can be relocated to the top front surface of the bezel frame 21. Other safety catch arrangements can be used for securing the doors 13 and 17, but they should avoid protruding structures as might injure a child, they should avoid the possibility of a child getting pinched in them, and they should be reasonably simple for a child to operate.

Figure 2:
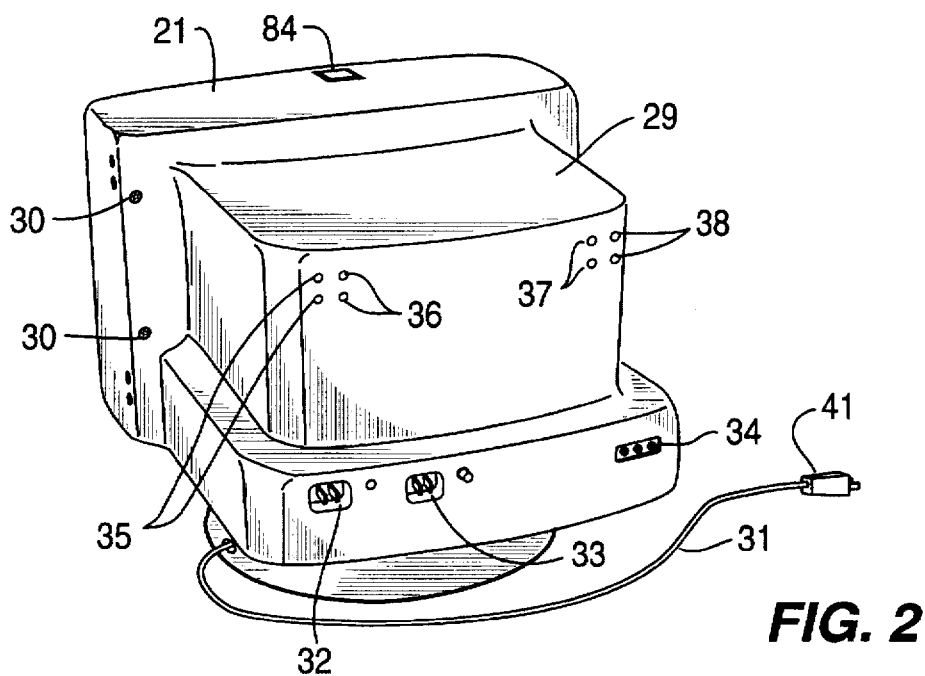
FIG. 2 is a rear perspective view of the child-transportable television receiver of FIG. 1.

FIG. 2 shows the rear of the child-transportable television receiver of FIG. 1. A one-piece engineering plastic rear shell 29, which forms the rear portion of the cabinet 10, joins to the bezel frame 21 and is secured thereto by screws 30. The engineering plastic from which the bezel frame 21 and the rear shell 29 are formed is an electrical insulator, permitting the use of transformerless power supplies in the television receiver without substantial electrical shock hazard. The screws have hour-glass slots or other special-shape slots (e.g., those used for securing auto headlamps) to frustrate a child attempting to separate the rear shell 29 from the bezel frame 21, and a liquid-excluding sealant is used in the joint between the rear shell 29 and the bezel frame 21. The corners of the rear shell 29 are rounded to reduce the change of injury to a child carrying the set or falling against the set. Preferably, the rear shell 29 is free from accessible holes to reduce the likelihood of a child attempting to poke objects into the receiver electronics and to reduce the likelihood of liquids being spilled into the television receiver. Also, carrying the receiver outdoors during rain or snow is less likely to cause problems. The rear shell 29 can have holes for inserting tools to make hold adjustments, etc. in its bottom surface, so as to be accessible only when the television receiver is dismounted from its swivel-and-tilt stand 11. If ventilation holes to permit heat generated within the television receiver to escape are necessary near the top of the cabinet 10, it is preferable to locate them in the front of the bezel frame 21, where they will be closed off by the doors 13 and 17 when the receiver is transported, so carrying the receiver outdoors during rain or snow is still feasible.

Unlike other portable television receivers, the FIG. 1 receiver is not provided with a top-located handle. This is done to encourage a child transporting the receiver to carry it with two hands, with the closed doors of the receiver against his stomach, since this carrying position is believed to pose less risk of injury to that child than his attempting to carry the receiver with a top-located handle. The swivel-and-tilt stand 11 is constructed so as not to interfere with such two-handed carrying, the center of weight for the set is located slightly to the front of the receiver, and the bottom of the rear shell 29 can have shallow grooves along its left and right sides to improve fingerhold. A power cord 31 is shown leading to a spring cord winder encased within the swivel-and-tilt stand 11, which imposes constraint on the amount of swivel. Alternatively, the spring cord winder can be located in the bottom of the rear shell 29, but this reduces the room for electronics in the rear shell 29 and tends to make the spring cord winder less accessible for servicing. Also, the spring cord winder has to be compartmentalized from the receiver electronics, which complicates the fabrication of the rear shell 29 as a single-unit molding. The loss of room for electronics in the rear shell 29 when the spring cord winder is included therewithin is of increased concern in a computer. In designs where power controls for electronic games are located in the front of the receiver or computer, power connections 32, 33 are provided on a back panel portion of the rear shell 29. This back panel portion of the rear shell 29 also has "antenna" connections 34 provided thereon for receiving radio-frequency signals from video games and from a cable hook-up, outdoor antenna, or video recorder. The FIG. 1 receiver has no rabbit ears or other type of on-set antennas normally found on a portable television receiver, because they might pose danger to a child falling on them when the receiver is set on the floor. Some designs include an interior antenna, which can be used for receiving local UHF broadcasting or VHF television signals rebroadcast on a 920 MHz from a base broadcast television receiver. There are "in" audio/video jacks 35 and "out" audio/video jacks 36 located on the back of the rear shell 29 for connection to a video cassette recorder. There are also "in" left/right stereophonic sound jacks 37 and "out" left/right stereophonic sound jacks 38 located on the back of the rear shell 29.

Figure 3:
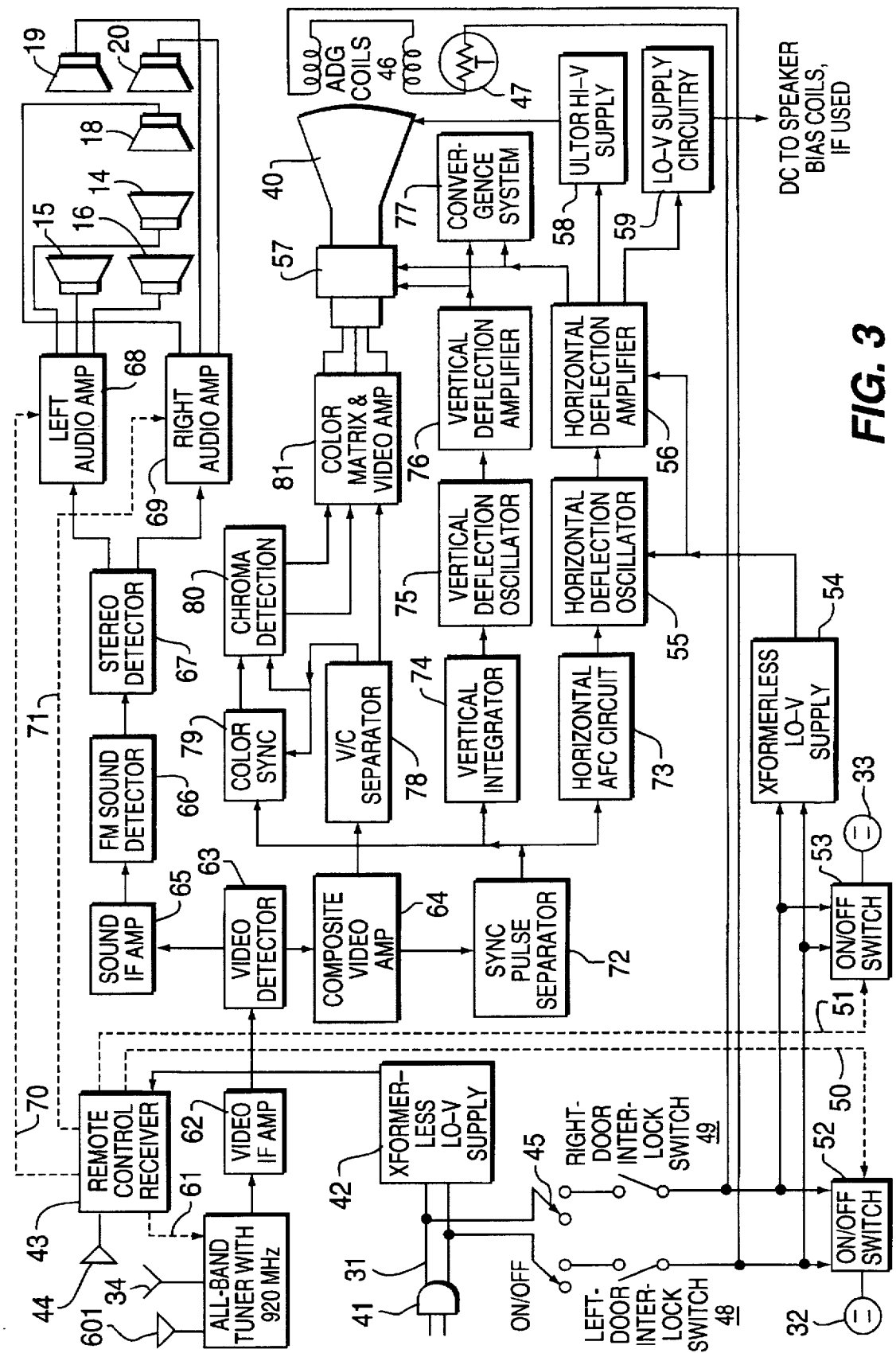
FIG. 3 is a block schematic diagram of the circuitry in the FIG. 1 child-transportable television receiver with doors that cover its kinescope display screen, including in accordance with an aspect of the invention left-door and right-door interlock switches for controlling the application of power to the automatic degaussing (ADG) coils.

FIG. 3 is a block schematic diagram of the circuitry in the FIG. 1 child-transportable television receiver with doors that cover the display screen of its color kinescope 40. When connected to the power main supply, the plug 41 supplies 50/60 Hz alternating current at conventional main supply voltages via the power cord 31 to a transformerless low-voltage supply 42 that rectifies and filters the power line voltage to develop a direct operating voltage for application to remote control receiver circuitry 43. The remote control receiver circuitry 43 responds to a modulated infrared light carrier sensed by a sensor 44 to generate control signals applied to various circuits in the television receiver as will be explained presently. The 50/60 Hz alternating current supplied via the power cord 31 is also supplied to a double-pole/double-throw on/off power switch 45 actuated by the rocker key 22 on the front of the FIG. 1 television receiver. Presuming the on/off power switch 45 to be in its "on" condition, in accordance with an aspect of the invention, the 50/60 Hz alternating current is subsequently selectively applied to a series connection of automatic degaussing coils 46 and a temperature-dependent resistor 47 of posistor type when and only when both a left-door interlock switch 48 and a right-door interlock switch 49 are simultaneously wide open. Accordingly, automatic degaussing takes place only after the loudspeakers 14–16 and 18–20 are swung away from the display screen of the color kinescope 40.

The problems of degaussing the kinescope can be mitigated by using electromagnetic loudspeaker motors that do not employ permanent magnets in their construction. The constant magnetic field for the speaker cone coils to work against can be provided by electromagnets, the magnetic structures of which are of low-magnetic-remnance material and the coils of which are supplied direct current from the low-voltage supply circuitry 59. The constant magnetic field is not established until after the doors 13 and 17 open to render the door interlock switches 48 and 49 conductive.

Responsive to a control signal supplied from the remote control receiver circuitry 43 via a connection 50, and responsive to the condition of the rocker key 25 on the front of the FIG. 1 receiver, an electrically controlled on/off switch 52 selectively applies the 50/60 Hz alternating current made available by the conduction of switches 45, 48 and 49 to the electrical receptacle 32. Responsive to a control signal supplied from the remote control receiver circuitry 43 via a connection 51, and responsive to the condition of the rocker key 25, an electrically controlled on/off switch 53 selectively applies the 50/60 Hz alternating current made available by the conduction of switches 45, 48 and 49 to the electrical receptacle 33.

The remaining portions of the FIG. 3 circuitry resemble those found in previous television receivers. The 50/60 Hz alternating current made available by the conduction of switches 45, 48 and 49 is supplied to a transformerless low-voltage supply 54 that rectifies and filters the power line voltage to develop a direct operating voltage supplied to a horizontal deflection oscillator 55 and to a horizontal deflection amplifier 56 driven therefrom. The horizontal deflection amplifier 56 includes a horizontal-output transformer with a secondary winding for applying horizontal-sweep sawtooth-waveform signal to horizontal-sweep coils in a magnetic deflection yoke 57 associated with the color kinescope 40. Sawtooth voltages are supplied from a tertiary winding of the horizontal-output transformer (as may be bootstrapped to the secondary winding of the horizontal-output transformer) to a high-voltage supply 58, which high-voltage supply 58 supplies ultor voltage to the color kinescope 40 and conventionally includes a voltage tripler therein. The horizontal-output transformer includes at least one additional winding for supplying voltage to be rectified and filtered in the low-voltage supply circuitry 59 for the rest of the television receiver. Since the horizontal-output transformer transforms power at frequencies above 15 kHz, rather than at the 50/60 Hz frequency of the power main supply, less "iron" is required in the transformer for supplying alternating input current to the low-voltage supply circuitry 59. This and the reduction in the size of the capacitors required for smoothing alternating current ripple from the direct operating voltages supplied by the supply circuitry 59, owing to the higher ripple frequency, reduce the weight of the low-voltage supply circuitry. This reduction in weight is of increased significance in a portable television receiver that is to be child-transportable. The electrical isolation provided to the low-voltage supply circuitry 59 by using at least one additional winding on the horizontal-output transformer for supplying voltage to be rectified and filtered avoids power main voltages being applied to the controls of the television receiver as in the case with an all transformerless power supply of the so-called "hot-chassis" type. This reduces shock hazard for a child who pries the knob or key of an electrical control device out of the television receiver with a screwdriver or similar implement.

Radio-frequency television signals received at the "antenna" connections 34 are supplied to a tuner 60, the tuning of which is controlled by either the rocker key 24 on the front of the FIG. 1 receiver or by signal supplied from the remote control receiver circuitry 43 via a connection 61. The tuner 60 preferably is an all-band tuner, capable of receiving cable channels as well as broadcast television channels, and preferably is equipped to receive television signals re-transmitted on a 920 MHz carrier to a small antenna 601 within the receiver cabinet 10. The tuner 60 converts the radio-frequency television signal it selects to a 45 MHz video-intermediate-frequency signal supplied to a video intermediate-frequency amplifier 62. The amplified video-intermediate-frequency signal is supplied to video detector circuitry 63 to be demodulated to recover a composite video signal supplied to a composite-video amplifier 64 and a frequency-modulated 4.5 MHz sound-intermediate-frequency signal supplied to a sound intermediate-frequency amplifier 65. The amplified sound-intermediate-frequency signal is supplied to an FM sound detector 66, which recovers either a baseband audio signal or a composite stereophonic signal supplied to a stereophonic detector 67. The stereophonic detector 67 supplies a left audio signal to left audio amplifier circuitry 68 which supplies the signals for driving the loudspeakers 14–16 in the left door 13 of the FIG. 1 television receiver. The stereophonic detector 67 also supplies a right audio signal to right audio amplifier circuitry 69 which supplies the signals for driving the loudspeakers 18–20 in the right door 17 of the FIG. 1 television receiver. The left audio amplifier circuitry 68 and the right audio amplifier circuitry 69 receive respective volume control signals from the remote control receiver circuitry 43 via connections 70 and 71, respectively.

A sync pulse separator 72 separates synchronizing pulses from the amplified composite video signal supplied thereto from the composite-video amplifier 64. These synchronizing pulses are supplied to a horizontal AFC circuit 73 that generates an automatic frequency control (AFC) signal from them. This AFC signal is applied to the horizontal deflection oscillator 55 for regulating the fundamental frequency of its oscillations to conform with horizontal line scanning frequency. The synchronizing pulses supplied from the sync pulse separator 72 are applied to a vertical integrator 74 to generate injection locking signals for a vertical deflection oscillator 75 for forcing the frequency of its sawtooth oscillations to conform with vertical field sweep frequency. These vertical sawtooth oscillations are amplified by a vertical deflection amplifier 76, which then applies the vertical-sweep sawtooth-waveform signal to vertical-sweep coils in the magnetic deflection yoke 57 associated with the color kinescope 40. A dynamic convergence system 77 receives, as input signals, the vertical-sweep sawtooth-waveform signal from the vertical deflection amplifier 76 and the horizontal-sweep sawtooth-waveform signal from the horizontal deflection amplifier 56.

The amplified composite video signal from the composite-video amplifier 64 is supplied to luminance/chrominance separation circuitry 78. Color synchronization circuitry 79 receives separated chrominance signal from the separation circuitry 78 and, responsive to horizontal synchronizing pulses in the output signal from the sync pulse separator 72, selects the color burst portions of the separated chrominance signal for synchronizing the oscillations of a local (3.58 MHz) color oscillator. These oscillations are supplied from the synchronization circuitry 79 to chrominance detection circuitry 80 and are used there for synchronously detecting the separated chrominance signal supplied from the separation circuitry 78 to the chrominance detection circuitry 80. The synchronous detection of the separated chrominance signal results in color difference signals which are supplied together with the separated luminance signal from the luminance/chrominance separation circuitry 78 to color matrixing and video amplifier circuitry 81. This circuitry 81 combines the color difference signals with the separated luminance signal to generate red, green and blue color signals which are amplified and used for controlling the emission of electrons from the red, green and blue electron guns in the color kinescope 40. In the protracted absence of color burst signal, as occurs when receiving black-and-white broadcasts or very-weak-signal color broadcasts, the synchronous detection of the separated chrominance signal in the chrominance detection circuitry 80 is discontinued; and the color matrixing and video amplifier circuitry 81 controls the emission of electrons from the red, green and blue electron guns in the color kinescope 40 so as to generate monochromatic response on the display screen.

Figure 4:
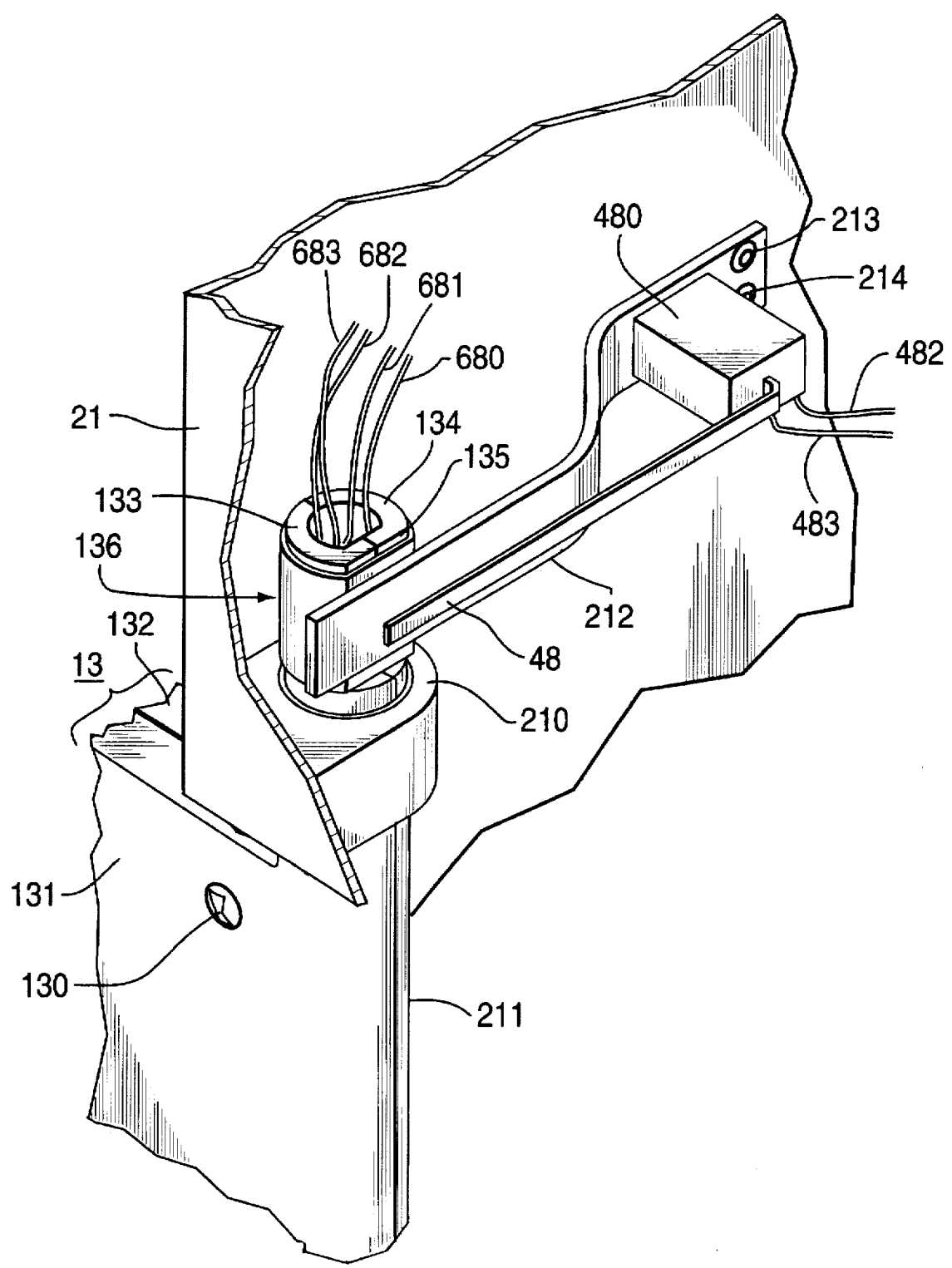
FIG. 4 is a perspective view of the interior of a portion of the bezel frame of the FIG. 1 child-transportable television receiver with loudspeakers in its doors, showing in detail one of the door hinges, one way to feed the connection wires for the loudspeakers from the receiver cabinet into its doors, and one way to implement a door interlock switch.

FIG. 4 shows in detail the top door hinge of the left door 13 of the FIG. 1 child-transportable television receiver with loudspeakers in its doors. The left front portion of the bezel frame 21 at the left of FIG. 4 is cut away. The door 13 has an interior side 131 and an exterior side 132 formed as separate plastic moldings and joined together, possibly with an adhesive cement, and held together by a plurality of self-tapping screws 130 (of which one is shown) that have hour-glass or other special-shape slots. The sides 131 and 132 have respective portions 133 and 134 that join together to form a pin for a pin-and-eye hinge, the eye 210 of which is molded into the bezel frame 21 or affixed thereto just above an opening in the bezel frame 21 for admitting the hinged portion of the door 13 sides of which hole are identified by the number 211 in FIG. 4. The hinge-pin portions 133 and 134 of the sides 131 and 132 of the door 13 are formed and arranged respective to each other to provide a hole through the hinge pin so that loudspeaker connection wires 680–683 that connect from the left audio amplifier circuitry 68 to the loudspeakers 14–16 can be threaded into the left door 13. The hinge pin formed from the hinge-pin portions 133 and 134 of the sides 131 and 132 is basically circularly cylindrical, but has a flat 135 on its end portion. A metal sleeve 136 fits tightly over the hinge-pin portions 133 and 134 of the sides 131 and 132 to strengthen the hinge pin in view of it being made hollow, which metal sleeve 136 aids in keeping the sides 131 and 132 of the door 13 together. Designs are possible in which the sides 131 and 132 of the door 13 slip one into the other and are held in place by metal sleeves over the hinge pins, without need for the screws 130. The metal sleeves such as 136 can be cemented to the hinge-pin portions they contain using an adhesive cement, rather than relying on force fit alone. The flat on the metal sleeve 136 has the unfettered end of a compression spring 212 pressed thereagainst when the door 13 is fully open to resist in measured degree the door 13 being closed; the fettered end of this spring 212 is riveted to the left side of the bezel frame 21 by rivets 213 and 214. The left-door interlock switch 48 of FIG. 3 is shown in FIG. 4 as a microswitch 480 affixed to the compression spring 212 (e.g., by epoxy cement). When the compression spring 212 presses against the flat on the metal sleeve 136, the lever arm 481 of the microswitch 480 is in its relaxed position; and the microswitch 480 provide a conductive connection between the wires 482 and 483. When the compression spring 212 presses against the rounded surface of the metal sleeve 136, the lever arm 481 of the microswitch 480 is forced from its relaxed position; and the microswitch 480 discontinues the conductive connection between the wires 482 and 483 until the compression spring 212 next again presses against the flat on the metal sleeve 136.

While the simple doors 13 and 17 shown in FIG. 1 are preferred for their simplicity and ease of achieving a rugged construction designs in which the left and right loudspeakers are located further apart can provide better stereophonic sound separation.

Figure 5:
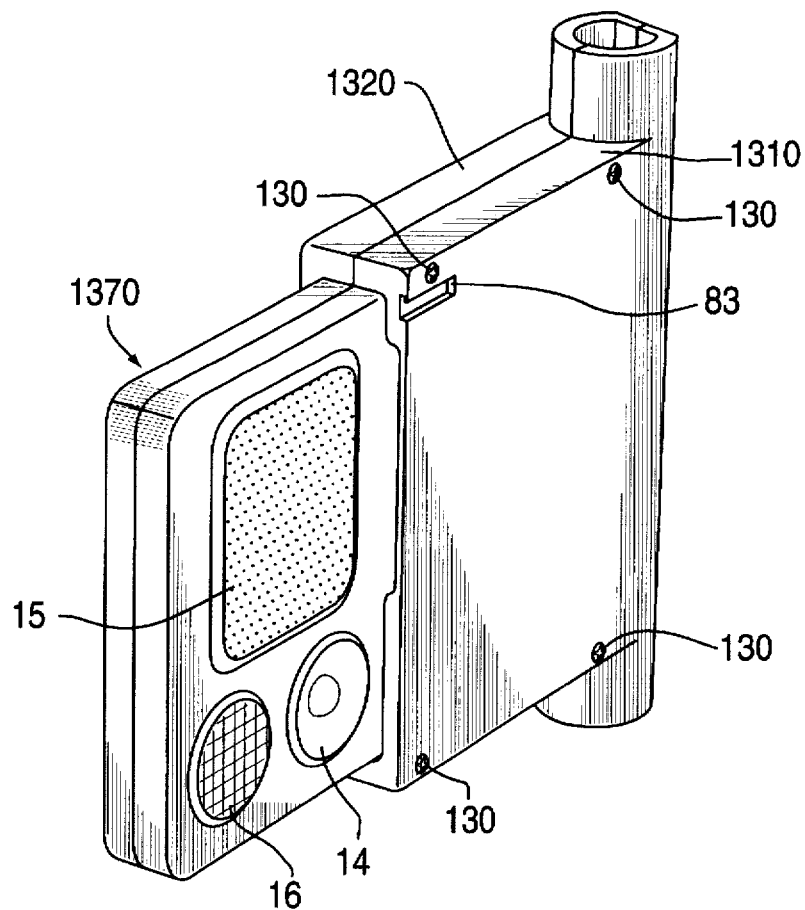
FIGS. 5 and 6 are perspective views of different types of door that can be used in modifications of the FIG. 1 child-transportable television receiver.

FIG. 5 shows a modification of the left door 13 in which the sides 131 and 132 of the door are replaced by sides 1310 and 1320 that form a case for a further sliding door portion 137 that can be pulled out to extend the positions of the loudspeakers 14-16 further from the cabinet 10. The modified left door of FIG. 5 is used with a similar modification of the right door 17.

Figure 6:
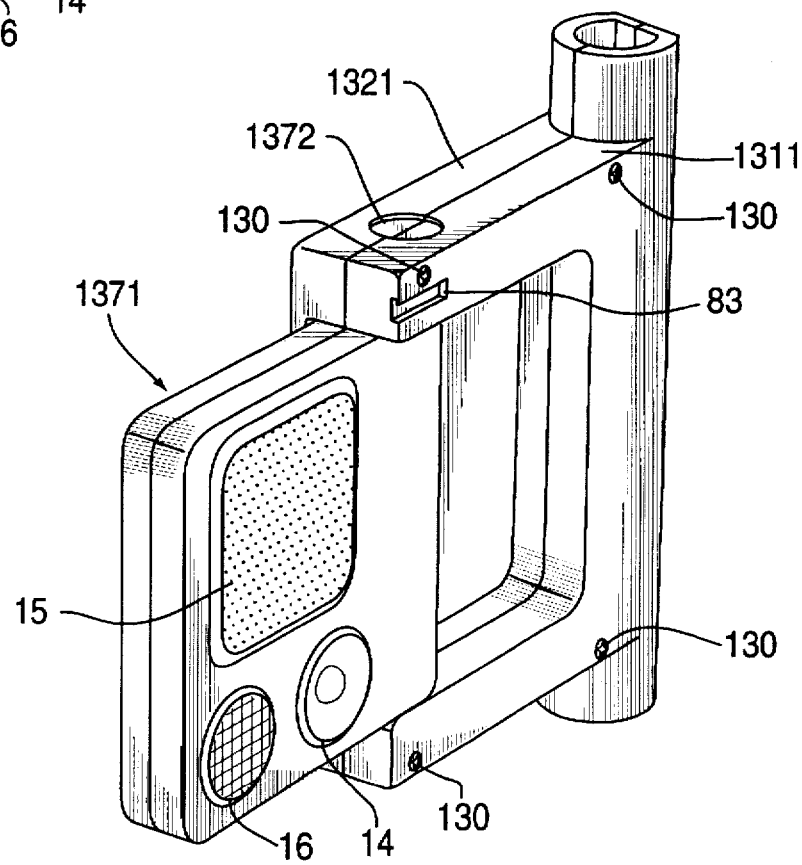

FIG. 6 shows a modification of the left door 13 in which the sides 131 and 132 of the door are replaced by sides 1311 and 1321 of a first panel of the left door that form a case for an unfolding second panel 1371 of the left door that swings out on pivots 1372 to extend the positions of the loudspeakers 14-16 further from the cabinet 10. One or both of the pivots 1372 can be provided with holes for threading speaker connection wires therethrough. The second panel 1371 of the left door will fold with the first panel thereof, and the folded combination will close over the left half of the display screen 12. The modified left door of FIG. 6 is used with a similar modification of the right door 17 that has first and second panels, designed so the second panel can fold with the first panel and the folded combination can then close over the right half of the display screen 12.

Figure 7:
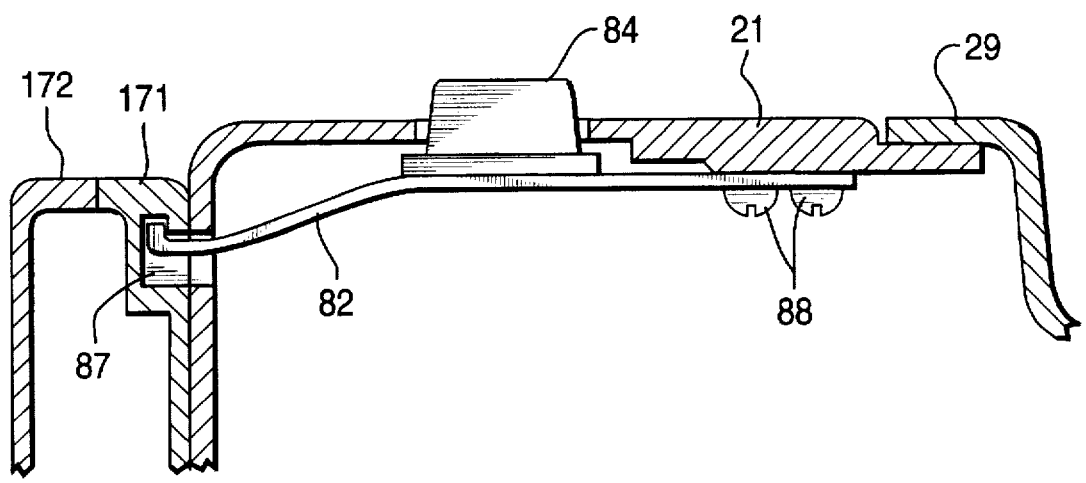
FIG. 7 is a sectional view of a latch mechanism for the doors of the FIG. 1 child-transportable television receiver.

FIG. 7 is a sectional view of the latch mechanism for the doors of the FIG. 1 child-transportable television receiver, with the right sides of the bezel frame 21 and the rear shell 29 being cut away, as well as portions of the closed right door 17. The section is through the edge of the closed right door 17 nearest the closed left door 13, which is hidden from view. The door 17 has an interior side 171 and an exterior side 172 formed as separate plastic moldings and joined together. The slot 87 at the top of the interior surface of the interior side 171 of the closed door 17 is shown in this sectional view. The spring catch 82 and the push button 84 are not cut away in FIG. 7, the section being presumed to be at the end of the slot 87. The spring catch 82 can be formed from a springy plastic or from spring metal. The fettered end of the spring catch 82 can be secured to the interior surface of the bezel frame 21 using an epoxy cement and self-tapping screws 88 threaded through clearance holes in the spring catch 82 and screwed into blind under-size holes running into the bezel frame 21 from its interior surface. The unfettered end of the spring catch 82 is hooked, and that hooked end settles up into the slots 83 and 87 in the interior surfaces of the closed doors 13 and 17 so as to engage grooves behind those interior surfaces. Depressing the push button 84 bends the spring catch 82 and disengages its hooked end from those grooves, permitting the compression springs 85 and 86 (shown in FIG. 1, but not in FIG. 7) to spring the doors 13 and 17 open.

Figure 8:
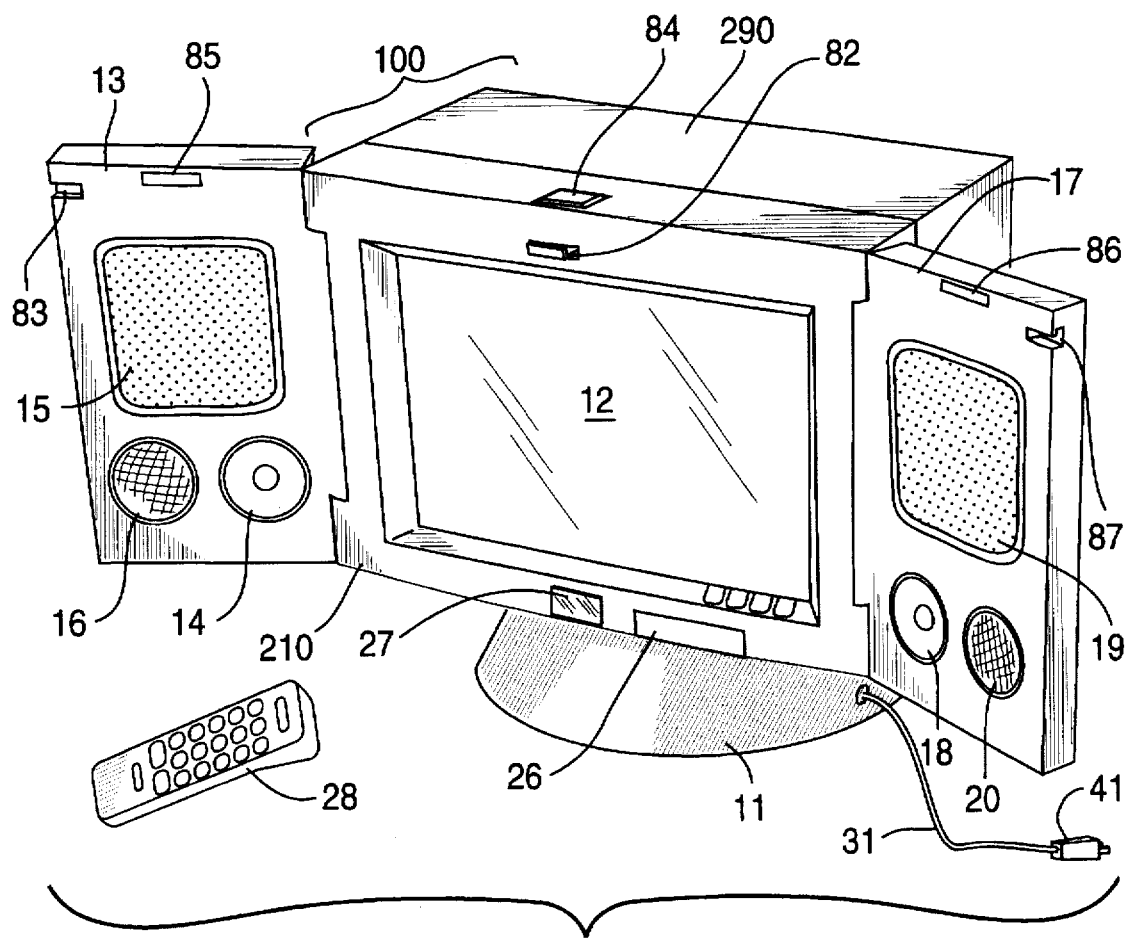
FIG. 8 is a front perspective view of a child-transportable television receiver embodying the invention, having doors that cover the display screen of its liquid crystal color display device during transport, and having stereophonic loudspeakers mounted in the doors, which open to the left and to the right of the display screen.

FIG. 8 shows a child-transportable television receiver embodying the invention, which uses a liquid crystal color display device rather than a kinescope, has doors 13 and 17 that cover the color display device 120 during transport, and has stereophonic loudspeakers 14-16 and 18-20 mounted in the doors 13 and 17, which open to the left and to the right of the display device 120. The cabinet 100 of the FIG. 8 television receiver is more box-like than the cabinet 10 of the FIG. 1 television receiver; and, since there is no need to accommodate a kinescope neck, the cabinet 100 can be constructed with a shorter front-to-back measurement for given screen size. The bezel frame 210 can be flatter than the bezel frame 21 of the FIG. 1 television receiver, but the bezel frame 210 is still used to provide room for domes on the loudspeakers 15 and 19 to swing into. The rear shell 290 is more rectanglar in its general shape than the rear shell 29 of the FIG. 1 television receiver and shorter front-to-back, but the features on the back of the rear shell 290 are similar to those on the back of the rear shell 29. The electronics of the FIG. 8 television receiver are conventional for a television receiver using a liquid crystal color display device. While the costs for producing appreciable-diagonal-size (25 cm. or more) liquid crystal display devices are currently very high, prices are likely to come down in the near future. Furthermore, the higher price of the liquid crystal display devices provides further justification for the use of doors to protect the display screen.

Embodiments of the invention within child-transportable personal computers or monitors for them, rather than embodiments of the invention within television receivers, differ in regard to the electronics for driving the display and in regard to the resolution provided in the display device. The computer will have different connections to peripheral apparatus. Rather than an infrared remote control unit, the peripheral apparatus will include a keyboard and usually one or more of the following: a mouse, a joy-stick controller and a light pen. Rather than connections being provided for connecting to a VCR and cable or antenna, connections are provided for connecting to a modem and to a printer. These differences are well understood by electronics designers. The design of the cabinet to have a substantially vertical display screen, the use of left- and right-swinging doors over the display screen and the inclusion of stereophonic loudspeakers in the doors characterize child-transportable personal computers, or monitors for them, that embody the invention.

In the claims which follow the phrase "said child-transportable portable television receiver or computer monitor" is to be construed as being descriptive of a general class of devices, which general class includes child-transportable portable television receivers, which general class includes child-transportable computer monitor, and which general class includes devices having combined capabilities of being used as a television receiver and being used as a computer monitor.

What is claimed is:

1. A child-transportable portable television receiver or computer monitor comprising:

a color kinescope with an integral display screen for direct viewing;

a cabinet enclosing said color kinescope except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

television receiver circuitry enclosed within said cabinet together with said color kinescope, said television receiver circuitry including a receiver for receiving radio-frequency carrier waves modulated with video and audio portions of a television signal and supplying demodulated video and audio signals in response thereto, said television receiver circuitry including video circuitry responsive to said demodulated video signal for supplying electrical signals to said color kinescope as will cause images to appear on said display screen, and said television receiver circuitry including audio circuitry responsive to said demodulated audio signal for supplying left and right sound-descriptive signals;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal.

2. A child-transportable portable television receiver or computer monitor as set forth in claim 1, wherein said left loudspeaker has a fixed mounting within said left door, and wherein said right loudspeaker has a fixed mounting within said right door.

3. A child-transportable portable television receiver or computer monitor as set forth in claim 1, wherein said cabinet enclosing said color kinescope or computer monitor except for its said display screen is mounted on a swivel-and-tilt stand.

4. A child-transportable portable television receiver or computer monitor as set forth in claim 1, wherein said receiver for receiving radio-frequency carrier waves includes a tuner for receiving television signals re-transmitted on a 920 MHz carrier.

5. A child-transportable portable television receiver or computer monitor as set forth in claim 1, wherein said receiver for receiving radio-frequency carrier waves includes a tuner for receiving television signals re-transmitted on a 920 MHz carrier, and wherein said tuner for receiving television signals re-transmitted on a 920 MHz carrier receives said re-transmitted television signals from an interior antenna located within said cabinet.

6. A child-transportable portable television receiver or computer monitor comprising:

a color kinescope having a display screen;

video circuitry for supplying electrical signals to said color kinescope as will cause images to appear on said display screen;

audio circuitry for supplying left and right sound-descriptive signals;

a cabinet enclosing said color kinescope except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door, constructed so as not to have any permanently magnetized element therewithin, and driven by said left sound-descriptive signal; and a right loudspeaker mounted within said right door, constructed so as not to have any permanently magnetized element therewithin, and driven by said right sound-descriptive signal.

7. A child-transportable portable television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened, said left door having respective first and second panels that can fold together to form a first folded combination that can close over the left half of said display screen, the first panel of said left door being hinged on a first side thereof to said cabinet near the left side of said display screen and being hinged on a second side thereof to a first side of the second panel of said left door;

a left loudspeaker having a fixed mounting to the second panel of said left door so as to be enfolded within said first folded combination, and being driven by said left sound-descriptive signal;

a right door hinged from said cabinet for covering the right-hand side of said display screen when closed and for extending from the right-hand side of said cabinet when opened, said right door having respective first and second panels that can fold together to form a second folded combination that can close over the right half of said display screen, the first panel of said right door being hinged on a first side thereof to said cabinet near the right side of said display screen and being hinged on a second side thereof to a first side of the second panel of said right door; and a right loudspeaker having a fixed mounting to the second panel of said right door so as to be enfolded within said second folded combination, and being driven by said right sound-descriptive signal.

8. A child-transportable portable television receiver or computer monitor comprising:

a television display device with a display screen;

video circuitry for supplying electrical signals to said television display device as will cause images to appear on said display screen;

audio circuitry for supplying left and right sound-descriptive signals:

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened, said left door having a first sliding member therewithin, which first sliding member can be extended from a side of said left door opposite from a side of said left door hinged to said cabinet;

a right door hinged from said cabinet for covering the right-hand side of said display screen when closed and for extending from the right-hand side of said cabinet when opened, said right door having a second sliding member therewithin, which second sliding member can be extended from a side of said right door opposite from a side of said right door hinged to said cabinet;

a left loudspeaker having a fixed mounting to said first sliding member within said left door and driven by said left sound-descriptive signal; and a right loudspeaker having a fixed mounting to said second sliding member within said right door and driven by said right sound-descriptive signal.

9. A child-transportable portable television receiver or computer monitor comprising:

a color kinescope having a display screen including a pattern of different color phosphors;

video circuitry for supplying electrical signals to said color kinescope as will cause images to appear on said display screen;

audio circuitry for supplying left and right sound-descriptive signals;

a cabinet enclosing said color kinescope except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal, said left and right loudspeakers having electromagnetic motors with elements therewithin that are or are likely to be permanently magnetized;

a set of degaussing coils at the perimeter of said display screen; and circuitry for supplying de-gaussing current to said degaussing coils for a time immediately after the following conditions simultaneously obtain: (a) said television receiver or computer monitor is supplied power, (b) said right door is fully open or substantially so, and (c) said left door is fully open or substantially so.

10. A child-transportable portable television receiver or computer monitor as set forth in claim 9, further comprising:

circuitry for supplying power to said television receiver or computer monitor only when said right door is fully open or substantially so at the same time said left door is fully open or substantially so.

11. A child-transportable portable television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a stand on which said cabinet enclosing said television display device except for its said display screen is mounted, said stand encasing a spring cord winder for the power cord of said child-transportable portable television receiver or computer monitor;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal.

12. A child-transportable portable television receiver or computer monitor as set forth in claim 11, wherein said stand is a tilt stand.

13. A child-transportable portable television receiver or computer monitor as set forth in claim 11, wherein said stand is a swivel stand.

14. A child-transportable portable television receiver or computer monitor as set forth in claim 11, wherein said stand is a swivel-and-tilt stand.

15. A child-transportable portable television receiver as set forth in claim 11 including a tuner for receiving television signals re-transmitted on a 920 MHz carrier.

16. A child-transportable portable television receiver or computer monitor as set forth in claim 15, wherein said tuner for receiving television signals re-transmitted on a 920 MHz carrier receives said re-transmitted television signals from an interior antenna located within said cabinet.

17. A child-transportable portable television receiver or computer monitor comprising:

a television display device with a display screen the color purity of which is unaffected by local magnetic fields near its display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal, said left and right loudspeakers having electromagnetic motors with elements therewithin that are or are likely to be permanently magnetized.

18. A child-transportable portable television receiver or computer monitor as set forth in claim 17 wherein said television display device is a liquid crystal color display device.

19. A television receiver or computer monitor comprising:

a television display device with a display screen;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

television receiver circuitry enclosed within said cabinet together with said television display device, said television receiver circuitry including a receiver for receiving radio-frequency carrier waves modulated with video and audio portions of a television signal and supplying demodulated video and audio signals in response thereto, said television receiver circuitry including video circuitry responsive to said demodulated video signal for supplying electrical signals to said television display device as will cause images to appear on said display screen, and said television receiver circuitry including audio circuitry responsive to said demodulated audio signal for supplying left and right sound-descriptive signals;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal.

20. A television receiver or computer monitor as set forth in claim 19, wherein said television display device is a color kinescope with an integral display screen for direct viewing.

21. A television receiver or computer monitor as set forth in claim 19, wherein said left loudspeaker has a fixed mounting within said left door, and wherein said right loudspeaker has a fixed mounting within said right door.

22. A television receiver or computer monitor as set forth in claim 19, wherein said cabinet enclosing said television display device or computer monitor except for its said display screen is mounted on a swivel-and-tilt stand.

23. A television receiver or computer monitor as set forth in claim 19, wherein said receiver for receiving radio-frequency carrier waves includes a tuner for receiving television signals re-transmitted on a 920 MHz carrier.

24. A television receiver or computer monitor as set forth in claim 23, wherein said tuner for receiving television signals re-transmitted on a 920 MHz carrier receives said re-transmitted television signals from an interior antenna located within said cabinet.

25. A television receiver or computer monitor comprising:

a color kinescope having a display screen including a pattern of different color phosphors;

video circuitry for supplying electrical signals to said color kinescope as will cause images to appear on said display screen;

audio circuitry for supplying left and right sound-descriptive signals;

a cabinet enclosing said color kinescope except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal, said left and right loudspeakers having electromagnetic motors with elements therewithin that are or are likely to be permanently magnetized;

a set of degaussing coils at the perimeter of said display screen; and circuitry for supplying de-gaussing current to said degaussing coils for a time immediately after the following conditions simultaneously obtain: (a) said television receiver or computer monitor is supplied power, (b) said right door is fully open or substantially so, and (c) said left door is fully open or substantially so.

26. A television receiver or computer monitor as set forth in claim 25, further comprising:

circuitry for supplying power to said television receiver or computer monitor only when said right door is fully open or substantially so at the same time said left door is fully open or substantially so.

27. A television receiver or computer monitor comprising:

a television display device with a display screen the color purity of which is unaffected by local magnetic fields near its display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal, said left and right loudspeakers having electromagnetic motors with elements therewithin that are or are likely to be permanently magnetized.

28. A television receiver or computer monitor as set forth in claim 27 wherein said television display device is a liquid crystal color display device.

29. A television receiver or computer monitor comprising:

a color kinescope having a display screen;

video circuitry for supplying electrical signals to said color kinescope as will cause images to appear on said display screen;

audio circuitry for supplying left and right sound-descriptive signals;

a cabinet enclosing said color kinescope except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door, constructed so as not to have any permanently magnetized element therewithin, and driven by said left sound-descriptive signal; and a right loudspeaker mounted within said right door, constructed so as not to have any permanently magnetized element therewithin, and driven by said right sound-descriptive signal.

30. A television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened, said left door having a first sliding member therewithin, which first sliding member can be extended from a side of said left door opposite from a side of said left door hinged to said cabinet;

a right door hinged from said cabinet for covering the right-hand side of said display screen when closed and for extending from the right-hand side of said cabinet when opened, said right door having a second sliding member therewithin, which second sliding member can be extended from a side of said right door opposite from a side of said right door hinged to said cabinet;

a left loudspeaker having a fixed mounting to said first sliding member within said left door and driven by said left sound-descriptive signal; and a right loudspeaker having a fixed mounting to said second sliding member within said right door and driven by said right sound-descriptive signal.

31. A television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened, said left door having respective first and second panels that can fold together to form a first folded combination that can close over the left half of said display screen, the first panel of said left door being hinged on a first side thereof to said cabinet near the left side of said display screen and being hinged on a second side thereof to a first side of the second panel of said left door;

a left loudspeaker having a fixed mounting to the second panel of said left door so as to be enfolded within said first folded combination, and being driven by said left sound-descriptive signal;

a right door hinged from said cabinet for covering the right-hand side of said display screen when closed and for extending from the right-hand side of said cabinet when opened, said right door having respective first and second panels that can fold together to form a second folded combination that can close over the right half of said display screen, the first panel of said right door being hinged on a first side thereof to said cabinet near the right side of said display screen and being hinged on a second side thereof to a first side of the second panel of said right door; and a right loudspeaker having a fixed mounting to the second panel of said right door so as to be enfolded within said second folded combination, and being driven by said right sound-descriptive signal.

32. A television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device except for its said display screen, which said display screen is at a front side of said cabinet, is substantially vertical as normally viewed, and has a left-hand side and a right-hand side as viewed from said front side of said cabinet, said cabinet having a left-hand side and a right-hand side in addition to its said front side;

a stand on which said cabinet enclosing said television display device except for its said display screen is mounted, said stand encasing a spring cord winder for the power cord of said television receiver or computer monitor;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal.

33. A television receiver or computer monitor as set forth in claim 32, wherein said stand is a tilt stand.

34. A television receiver or computer monitor as set forth in claim 32, wherein said stand is a swivel stand.

35. A television receiver or computer monitor as set forth in claim 32, wherein said stand is a swivel-and-tilt stand.

36. A television receiver as set forth in claim 32 including a tuner for receiving television signals re-transmitted on a 920 MHz carrier.

37. A television receiver or computer monitor as set forth in claim 36, wherein said tuner for receiving television signals re-transmitted on a 920 MHz carrier receives said re-transmitted television signals from an interior antenna located within said cabinet.

* * * * *